United States Patent
Manne et al.

(10) Patent No.: US 11,902,969 B2
(45) Date of Patent: Feb. 13, 2024

(54) METHOD FOR WIRELESS COMMUNICATION USING BEAMFORMED PHYSICAL DOWNLINK CONTROL CHANNEL (PDCCH)

(71) Applicants: INDIAN INSTITUTE OF TECHNOLOGY HYDERABAD (IITH), Sangareddy (IN); WISIG NETWORKS PRIVATE LIMITED, Hyderabad (IN)

(72) Inventors: Pavan Kumar Reddy Manne, Hyderabad (IN); Harish Kumar Dureppagari, Hyderabad (IN); Saidhiraj Amuru, Hyderabad (IN); Kiran Kumar Kuchi, Hyderabad (IN)

(73) Assignees: INDIAN INSTITUTE OF TECHNOLOGY HYDERABAD (IITH); WISIG NETWORKS PRIVATE LIMITED

(*) Notice: Subject to any disclaimer, the term of this patent is extended or adjusted under 35 U.S.C. 154(b) by 460 days.

(21) Appl. No.: 17/290,290

(22) PCT Filed: May 6, 2020

(86) PCT No.: PCT/IN2020/050404
§ 371 (c)(1),
(2) Date: Apr. 30, 2021

(87) PCT Pub. No.: WO2020/225825
PCT Pub. Date: Nov. 12, 2020

(65) Prior Publication Data
US 2021/0392669 A1 Dec. 16, 2021

(30) Foreign Application Priority Data
May 6, 2019 (IN) .............................. 201941017958

(51) Int. Cl.
*H04W 72/12* (2023.01)
*H04W 72/1273* (2023.01)
(Continued)

(52) U.S. Cl.
CPC ....... *H04W 72/1273* (2013.01); *H04L 1/0004* (2013.01); *H04L 1/203* (2013.01);
(Continued)

(58) Field of Classification Search
CPC ... H04B 7/0695; H04L 1/0003; H04L 1/0004; H04L 1/0009; H04L 1/0026; H04L 1/203;
(Continued)

(56) References Cited

U.S. PATENT DOCUMENTS 10,763,932 B2 * 9/2020 Pitakdumrongkija ...................... H04W 72/23
2017/0265200 A1 * 9/2017 Sagong ................. H04L 1/1887
(Continued)

FOREIGN PATENT DOCUMENTS

| KR | 20190035672 A | 4/2019 | |
|---|---|---|---|
| WO | 2017039737 A1 | 3/2017 | |
| WO | WO-2017118079 A1 * | 7/2017 | ............... H04B 7/04 |

OTHER PUBLICATIONS

Int'l Search Report and Written Opinion Appln No. PCT/IN2020/050404 dated Sep. 9, 2020.
(Continued)

*Primary Examiner* — Robert J Lopata
(74) *Attorney, Agent, or Firm* — McAndrews, Held & Malloy, Ltd.

(57) ABSTRACT

Embodiments of the present disclosure are related a method for wireless communication. The method comprises receiving by a base station (BS), signals from a plurality of user equipment's (UEs) and obtaining channel estimates associated with each UE using the received signals. Next, calcu-
(Continued)

PDCCH, PDSCH, CRS transmitted in a sectorial beam

PDCCH and CRS transmitted in a sectorial beam

PDSCH, EPDCCH and DMRS transmitted across beams lating a first metric for each UE, and each of the plurality of beams associated with the BS using the obtained channel estimates and determining one or more best beams from a plurality of beams associated with the BS, and a second metric for each UE using the first metric. Further, segregating the UEs into groups based on the determined one or more best beams and the second metric. Thereafter, performing beamforming on control channel based on the one or more best beams, and performing allocation of at least one of resources, modulation and coding scheme for a control channel based on the segregated groups.

20 Claims, 11 Drawing Sheets

(51) Int. Cl.
| | |
|---|---|
| *H04L 1/00* | (2006.01) |
| *H04L 1/20* | (2006.01) |
| *H04W 72/0446* | (2023.01) |
| *H04W 72/0453* | (2023.01) |
| *H04W 72/044* | (2023.01) |
| *H04W 72/23* | (2023.01) |

(52) U.S. Cl.
CPC ..... *H04W 72/046* (2013.01); *H04W 72/0446* (2013.01); *H04W 72/0453* (2013.01); *H04W 72/23* (2023.01)

(58) Field of Classification Search
CPC ... H04L 5/0053; H04L 5/0055; H04L 5/0057; H04W 72/0446; H04W 72/0453; H04W 72/046; H04W 72/121; H04W 72/1273; H04W 72/23; H04W 72/542
USPC .......................................................... 370/329
See application file for complete search history.

(56) References Cited

U.S. PATENT DOCUMENTS

2017/0303263 A1* 10/2017 Islam .................... H04L 5/0048
2019/0296814 A1*  9/2019 Kakishima ........... H04B 7/0626
2021/0083728 A1*  3/2021 Cheraghi ............. H04B 7/0617

OTHER PUBLICATIONS

Amuru, S. & Kuchi, K. (2019) A Novel Beamformed Control Channel Design for LTE with Full Dimension-MIMO. arXiv preprint arXiv:1905.05520. May 14, 2019.

* cited by examiner

PDCCH, PDSCH, CRS transmitted in a sectoral beam

PDCCH and CRS transmitted in a sectorial beam

PDSCH, EPDCCH and DMRS transmitted across beams (a). User scheduled in single best beam (b). User scheduled in best 2 beams

METHOD FOR WIRELESS COMMUNICATION USING BEAMFORMED PHYSICAL DOWNLINK CONTROL CHANNEL (PDCCH)

CROSS-REFERENCE TO RELATED APPLICATIONS

This application is a national stage application under 35 U.S.C. § 371 of application Serial No. PCT/IN2020/050404, filed on May 6, 2020, and entitled "METHOD FOR WIRELESS COMMUNICATION USING BEAMFORMED PHYSICAL DOWNLINK CONTROL CHANNEL (PDCCH)" which claims priority from the Indian Provisional Patent Application Numbers 201941017958, filed on May 6, 2019, the entirety of which are hereby incorporated by reference. The aforementioned application is hereby incorporated herein by reference in its entirety.

TECHNICAL FIELD

Embodiments of the present disclosure are related, in general to communication, but exclusively relate to a method and a system for wireless communication using beamformed physical downlink control channel (PDCCH).

BACKGROUND

Full Dimension Multi Input Multi Output (FD-MIMO) is a key technology in achieving larger network throughputs, by simultaneously connecting a large number of devices. In FD-MIMO, a two dimensional antenna array structure is used that helps in beamforming along both elevation and azimuth directions. The FD-MIMO beamforming, an increased multi-user MIMO can be performed, and thus a multi-fold improvement may be achieved in network throughput. The third generation partnership project (3GPP) standard in Releases 8 to 13 continuously evolved its specifications to enhance the multi-user MIMO feature. Thus, enabled base station to support a large number of users. It also supports both azimuth and elevation beamforming for the data channel. Based on a newly introduced channel state information-reference signals (CSI-RS) and demodulation reference signals (DMRS), the beamforming is performed for the data channel. Using such beamforming, 2 to 3.6 times gain in the cell throughput may be achieved.

In Long Term Evolution (LTE), the downlink physical layer comprises five channels. The channels are physical broadcast channel (PBCH) for broadcasting the system information, physical control format indicator channel (PCFICH) for defining the structure of the control channel, physical HARQ indicator channel (PHICH) for conveying the ACK/NACK, physical downlink control channel (PDCCH) for carrying the control information and physical downlink shared channel (PDSCH) for transmitting the user intended data. A downlink control information (DCI) conveys an information required to decode the user intended data. The PDCCH region in any sub frame is limited to 3 symbols and hence, can accommodate a limited number of DCIs in a transmission time interval (TTI). Thus, the PDCCH effectively indicates the number of users scheduled in any TTI.

In Release 8 of 3GPP specifications, PDCCH and PDSCH rely on cell-specific reference signals (CRS) for the channel estimation. Whereas from Release 13, the PDSCH supports beamforming and hence, has DMRS for the channel estimation. FIGS. 1A and 1B shows transmission of the physical layer signals in both Release 8 and Release 13, respectively. The CRS is common for all the users and beamforming CRS would impact the performance of cell search and synchronization. Thus, with the current 3GPP specifications, the control channel does not possess the benefits of beamforming. A user can decode the data channel only after decoding a DCI. Thus, even though the beamforming allows to schedule more users in PDSCH, the PDCCH has a limited capacity and has become a bottleneck in increasing the network throughput. In Release 11, to enhance the PDCCH capacity, 3GPP introduced enhanced PDCCH (EPDCCH) design which uses the concepts of beamforming. However, the EPDCCH has to be transmitted in the resources of the data channel as shown in FIG. 2, and the location of the EPDCCH has to be conveyed prior to the user. FIG. 2 shows EPDCCH configuration in a sub-frame.

The availability of the large antennae structure with the FD-MIMO is never exploited in the context of the PDCCH. This may be because for beamforming, some feedback is required from the user. However, a control channel itself is the first communication link where the user performs blind decoding for the DCI. Improving the PDCCH capacity by exploiting the large antennae structure has a high impact on network throughput and has never been considered in the literature.

There is a method to optimally schedule the users in PDCCH and thus, increase the control channel capacity. Also, there is a method of allocation for cell radio network temporary identifiers and increase the control channel capacity. A power allocation technique or method exists to improve the control channel capacity. However, none of these methods discussed the beamforming and exploited the large antennae structure for increasing the control channel capacity. A search space designs of EPDCCH have been presented to improve the capacity of the control channel. Also, performance and analysis of the EPDCCH design is presented. Further, an algorithm to improve the channel estimation accuracy was proposed and thus, in turn, improve the performance of the EPDCCH. However, as per the 3GPP specifications, the EPDCCH uses the resource elements from the data channel for beamforming. Thus, none of existing methods or papers addressed the issue of increasing the control channel capacity by exploiting the large antennae structure.

The DCI is the payload transmitted in PDCCH, which carries the information for decoding the user data, location of uplink scheduling, random access responses, modulation and coding scheme. There are various DCI formats for each purpose. Prior to transmission, the DCI payload is appended with cyclic redundancy check parity bits, convolution coded and is then rate-matched to a certain number of bits called aggregation level (AL). These rate-matched bits are then QPSK modulated and multiplexed in the radio frame.

The PDCCH is present in the first few orthogonal frequency division multiplexing (OFDM) symbols of every sub frame. The number of symbols for PDCCH is defined by PCFICH. The first OFDM symbol comprises multiplexed PCFICH, PHICH and PDCCH. In LTE, the smallest time-frequency resource in a radio frame is called as a resource element. Excluding the PCFICH and PHICH resource elements, the remaining resource elements available are grouped in number of four, in a frequency first and time second manner, and are referred as Resource Element Groups (REGs). A collection of nine such REGs is called as one control channel element (CCE). In LTE PDCCH, the allocation of the DCIs is done in units of CCEs. FIG. 3 shows formation of CCEs as per current 3GPP specifications. Based on the channel conditions of the user, the payload is rate matched to an aggregation level. The data in one AL can fit in one CCE. In LTE PDCCH, the AL 1, 2, 4, 8 and thus, AL=2 requires 2 CCEs and so on. A search space is defined as the region or collection of CCEs over which a user expects a DCI.

The user does not know the exact location of the DCI in PDCCH and hence, has to perform blind decoding over the PDCCH region. To reduce these blind decoding attempts, 3GPP limits the region (or CCEs) over which the user has to perform blind decoding. This region (or CCEs) is termed as search space. There are two search spaces in the control channel region.

The control channel region is broadly classified into Common Search Space (CSS) and UE specific Search Space (USS). The CSS is a region in which, common DCIs that carry system information, paging and common scheduling information are transmitted. The USS is a region in which DCIs intended for a particular user are transmitted. The number of CCEs in PDCCH vary with the number of symbols over which PDCCH is present and also with the bandwidth of the system. In any sub frame, irrespective of the number of CCEs available, the CSS is present only in the first 16 CCEs. The search space design as per the current 3GPP specifications is shown in FIG. 4.

In any search space, the scheduling of DCIs is carried out as follows. For each DCI, based on the AL and the user identity, possible CCEs for scheduling are calculated using the formula given in (1). The base station can transmit the DCI in any of those possible CCE locations.

$$CCE_{index} = L\{(Y_k + m) \bmod [N_{CCE,k}/L]\} + i \quad (1)$$

where, i=0 ... L−1, L is aggregation level, $N_{CCE,k}$ is number of CCEs in the sub frame k, $Y_k$ and m are the constants defined by Radio Resource Control (RRC) layer in 3gpp standard. The user has no information about the location and the aggregation level of the DCI. Hence, the user calculates all the possible indices and blindly performs the search at all those locations. This procedure is repeated for all the aggregation levels until a DCI is decoded.

In any sub frame, based on the available bandwidth, there are a limited number of CCEs in PDCCH. This limitation has an impact on the multi-user scheduling in PDSCH. Later, an enhanced PDCCH design was introduced to increase the PDCCH capacity. The EPDCCH is transmitted in the data channel region as shown in the FIG. 2. The search space region for monitoring the DCI in EPDCCH is conveyed to the user prior through radio resource signalling. The advantage of the EPDCCH is that it can use beamforming concepts like data channel and thus, schedule more number of DCIs. However, this comes at the cost of sacrificing the PDSCH resources which reduces the throughput of a UE which in turn reduces the network throughput. Also, the EPDCCH has demodulation reference signals to decode the beam formed data. Hence, there is a need of improving the PDCCH capacity using the large antennae structure to have a high impact on network throughput.

REFERENCES

1. Y. Nam, B. L. Ng, K. Sayana, Y. Li, J. Zhang, Y. Kim, and J. Lee, "Full-dimension MIMO (FD-MIMO) for next generation cellular technology," IEEE Communications Magazine, vol. 51, no. 6, pp. 172-179, June 2013.
2. J. Lee, Y. Kim, Y. Kwak, J. Zhang, A. Papasakellariou, T. Novlan, C. Sun, and Y. Li, "LTE-advanced in 3GPP Rel-13/14: an evolution toward 5G," IEEE Communications Magazine, vol. 54, no. 3, pp. 36-42, March 2016.
3. A. Roessler and M. Kottkamp, "LTE Advanced (3GPP Rel.11) Technology Introduction," 2013.
4. Physical Channels and Modulation, 3GPP TS 36.211, Jul. 2016.
5. Multiplexing and Channel Coding, 3GPP TS 36.212, Jun. 2016.
6. Physical Layer Procedures, 3GPP TS 36.213, Jun. 2016.
7. Samsung 5G-Ready LTE Massive MIMO Solutions Advance Sprint's Network, Los Angeles, Samsung, 2018.
8. LTE Evolution to Build All Business Foundation, Shenzen, China, Huawei, White Paper, 2019.
9. Balamurali, "Optimal downlink control channel resource allocation for LTE systems," in Int. Conf. Signal Process. Commun. (SPCOM), Bangalore, India, July 2010, pp. 1-5.
10. S. Kucera and D. Lopez-Perez, "Expanding Coverage Range and Control Channel Capacity of Co-Channel LTE Small Cells by Using PDCCH Orthogonalization," in Proc. IEEE 80th Veh. Technol. Conf. (VTC), Vancouver, B C, 2014, pp. 1-5.
11. D. G. González et al., "Power allocation for the PDCCH in LTE: A way to increase its capacity in realistic deployments," in Proc. Int. Symp. Wireless Personal Multimedia Commun. (WPMC), Atlantic City, 2013, pp. 1-5.
12. M. P. Reddy et al., "Joint control and shared channel scheduling for downlink in 3gpp narrowband-iot," in 2020 International Conference on COMmunication Systems NETworkS (COMSNETS), 2020, pp. 476-483.
13. S. Hirayama et al., "Performance of downlink control information signals using decision-feedback channel estimation for EPDCCH," in IEEE Int. Conf. Commun. Syst., Macau, 2014, pp. 625-629.
14. F. Nabil and Y. A. Fahmy, "Scattered search space scheme for PDCCH and ePDCCH in LTE-advanced," in 7th Int. Congress Ultra-Modern Telecomm. Control Syst. Workshops (ICUMT), Brno, 2015, pp. 172-177.
15. S. Ye et al., "Enhanced Physical Downlink Control Channel in LTE Advanced Release 11," IEEE Commun. Mag., vol. 51 no. 2, pp. 82-89, February 2013.
16. A. K. Talukdar, "Performance Evaluation of the Enhanced Physical Downlink Control Channel in a LTE Network," in IEEE Int. Symp. on Personal, Indoor, and Mobile Radio Commun. (PIMRC), London, 2013, pp. 987-991.
17. L. Liu et al., "Search space design of enhanced physical downlink control channel for long term evolution advanced system," in IEEE Wireless Commun. Netw. Conf. (WCNC), Shanghai, 2013, pp. 3323-3328.
18. Radio Resource Control (RRC), 3GPP TS 36.331, January 2016.
19. Study on channel model for frequencies from 0.5 to 100 GHz, 3GPP TR 38.901, June 2018.
20. Spatial channel model for Multiple Input Multiple Output (MIMO) simulations, 3GPP Std. TR 25.996, v 9.0.0, 2009-12.
21. D. Laselva, F. Capozzi, F. Frederiksen, K. I. Pedersen, J. Wigard, and I. Z. Kovacs, "On the impact of realistic control channel constraints on qos provisioning in utran lte," in 2009 IEEE 70th Vehicular Technology Conference Fall, September 2009, pp. 1-5.
22. User Equipment (UE) radio transmission and reception, 3GPP Std. TS 36.101, v 14.1.0, September 2008.
23. Study on 3D channel model for LTE, 3GPP Std. TR 36.873, v12.7.0, December 2017.

24. Clarification on the Wrap-Around Hexagon Network Structure, IEEE 802.20 Std. C802.20-05/15, March, 2005.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In one aspect of the present disclosure a method of wireless communication is disclosed. The method comprising receiving, by a base station, signals from a plurality of user equipment's (UEs) and obtaining channel estimates associated with each of the plurality of UEs using the received signals. Also, the method comprises calculating a first metric for each of the plurality of UEs, and each of the plurality of beams associated with the base station using the obtained channel estimates and determining one or more best beams from a plurality of beams associated with the base station, and a second metric for each of the plurality of UEs using the first metric. Further, the method comprises segregating the plurality of UEs into a plurality of groups based on the determined one or more best beams and the second metric, each of the plurality of groups comprises one or more UEs. Furthermore, the method comprises performing beamforming on control channel based on the one or more best beams, and performing allocation of at least one of resources, modulation and coding scheme for a control channel based on the segregated plurality of groups.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

Figure 7:
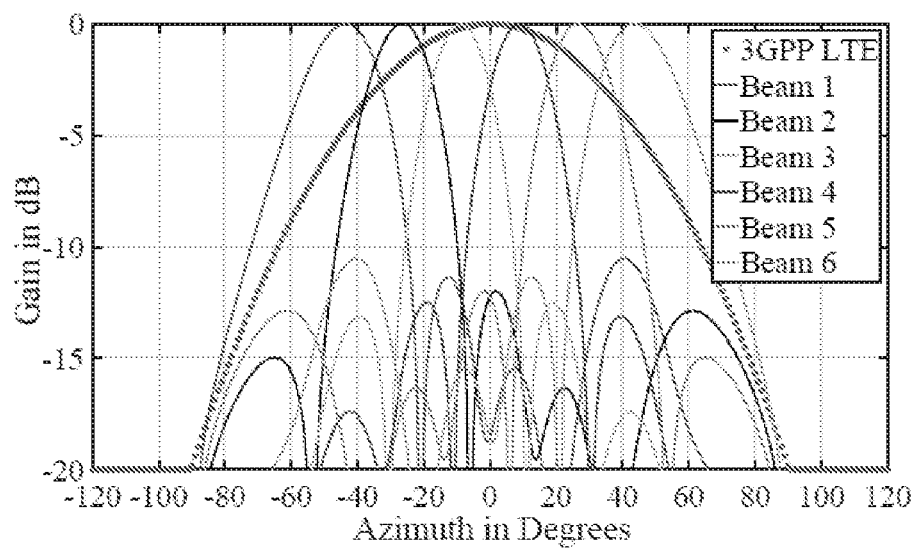
Figure 8:
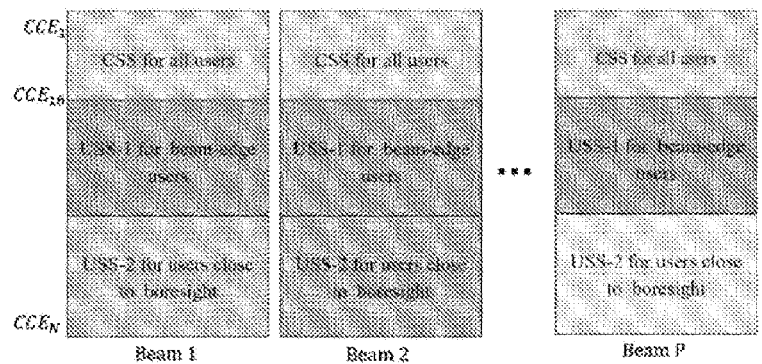
Figure 9A:
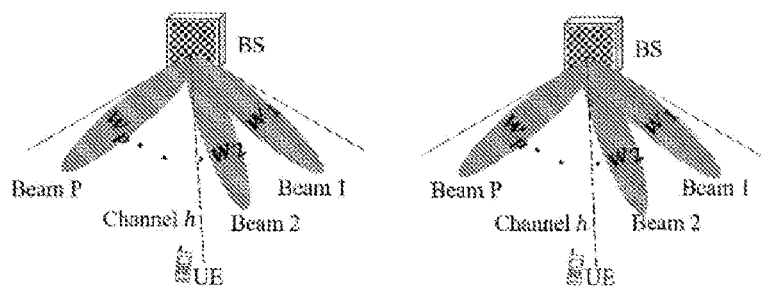
Figure 9B:
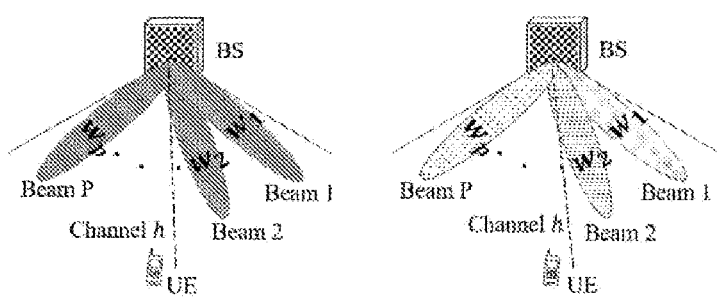
Figure 10:
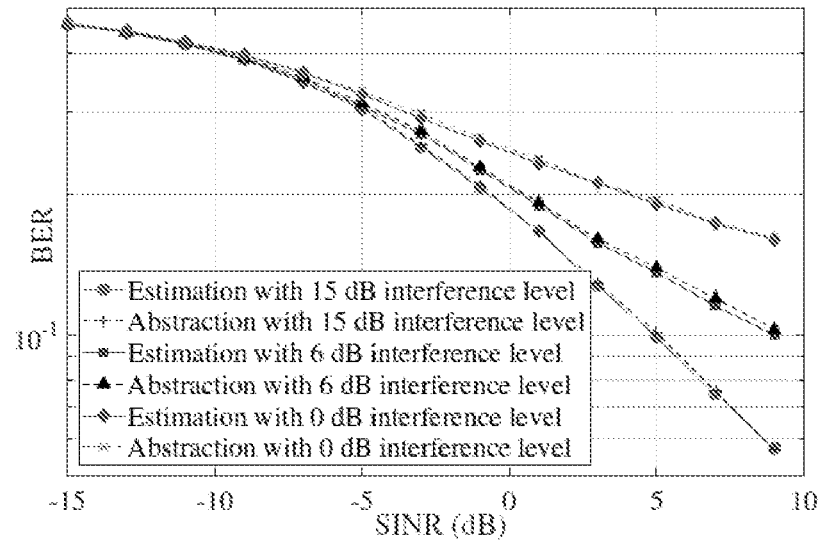
Figure 11:
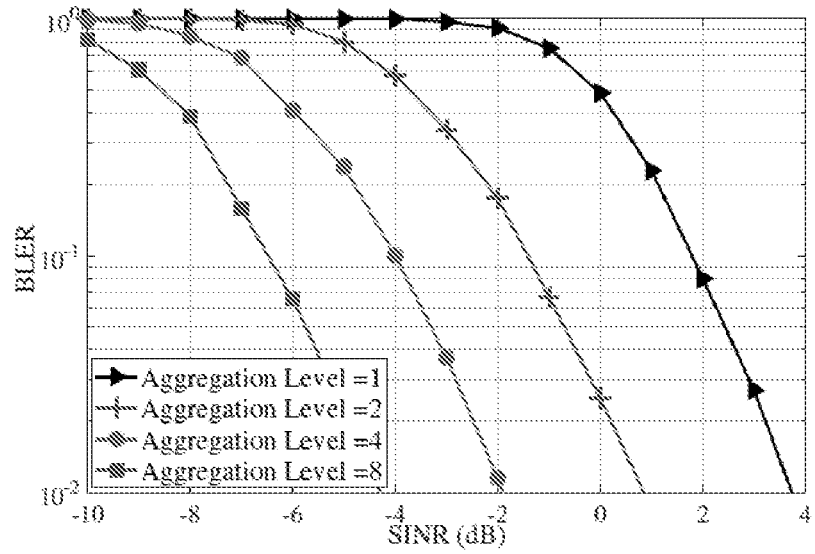
Figure 12:
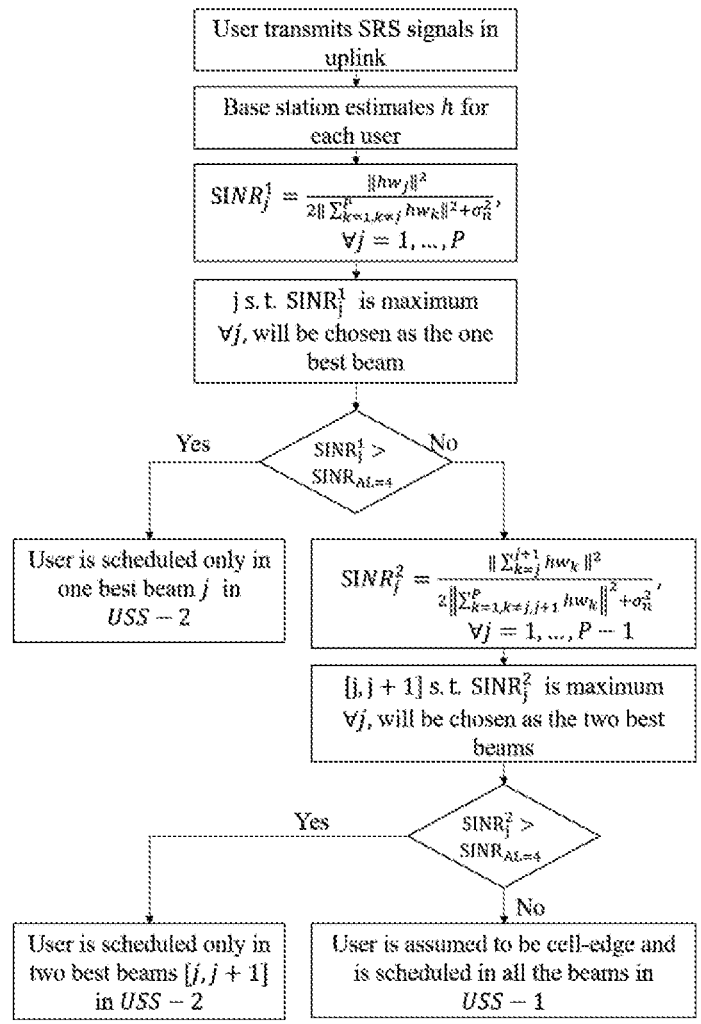
Figure 13A:
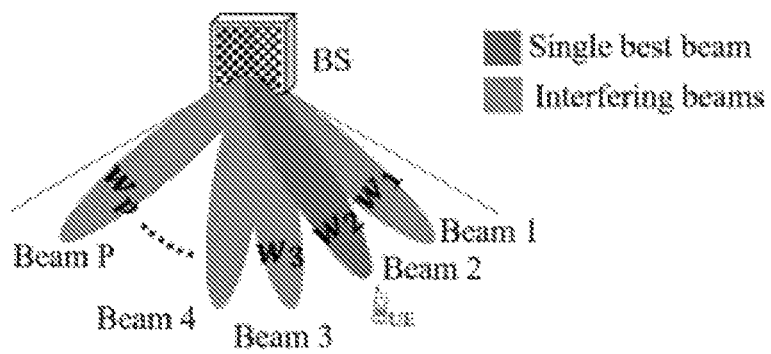
Figure 13B:
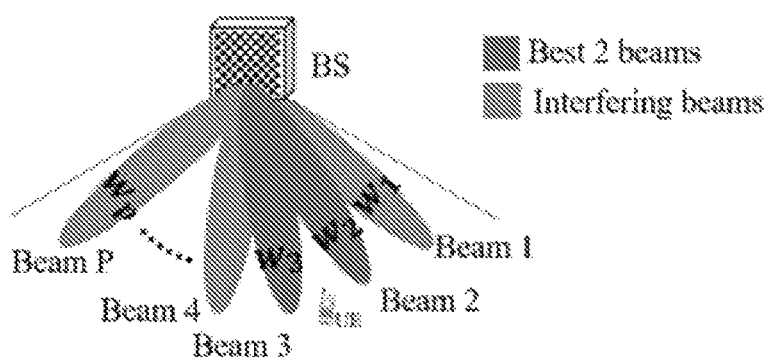
Figure 14:
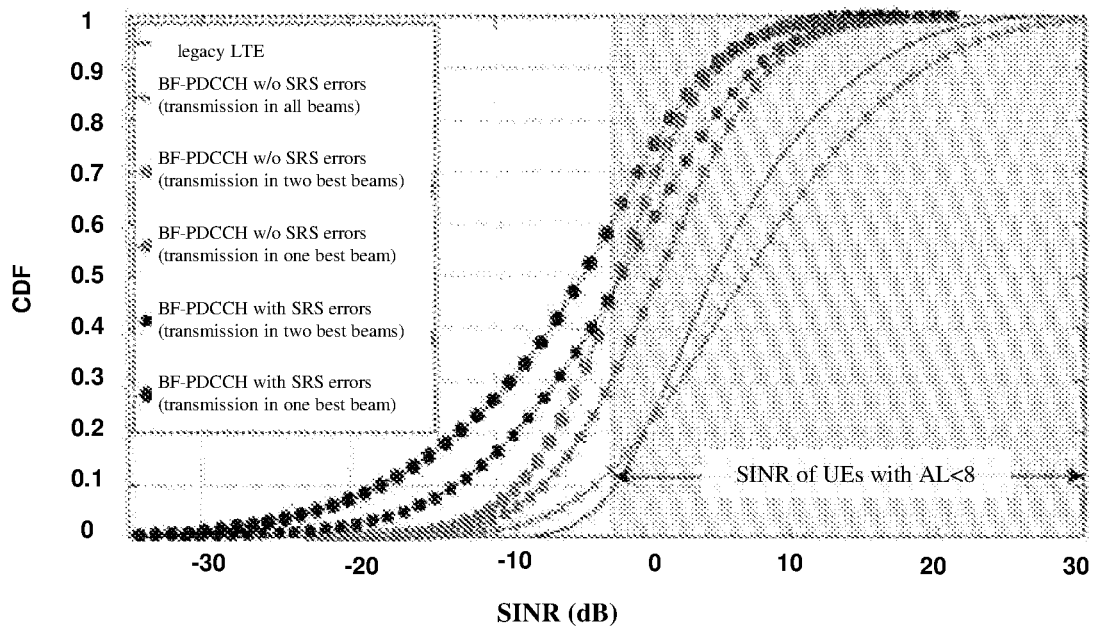
Figure 15:
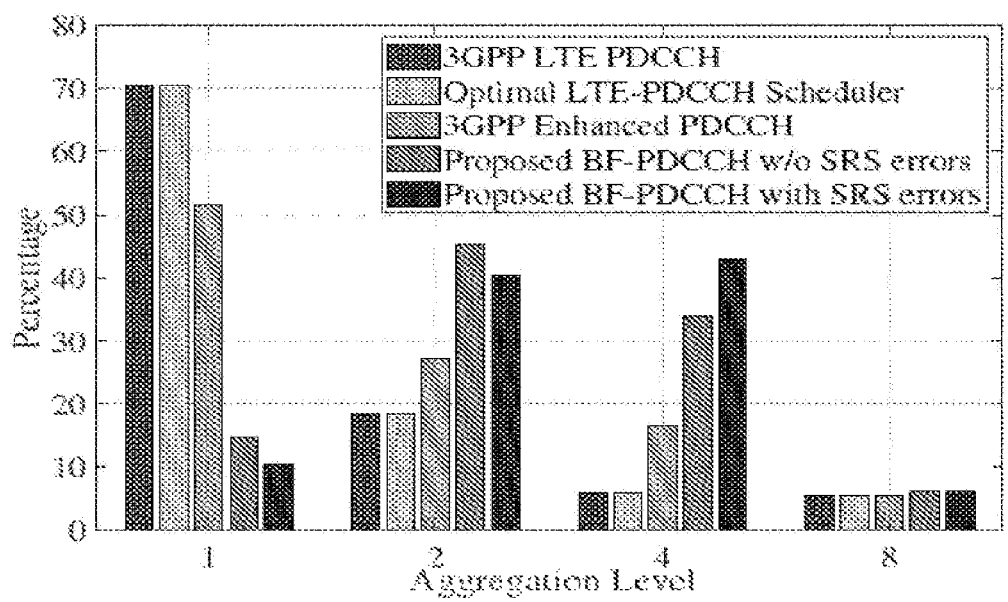
Figure 16:
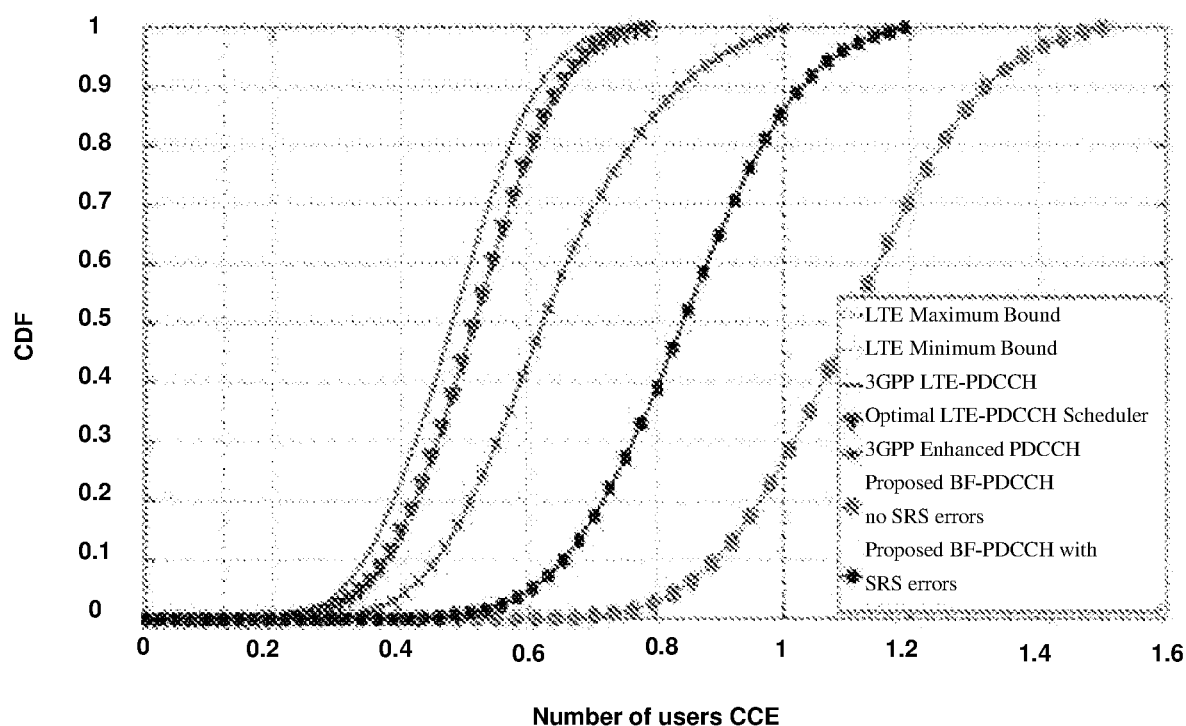
Figure 17:
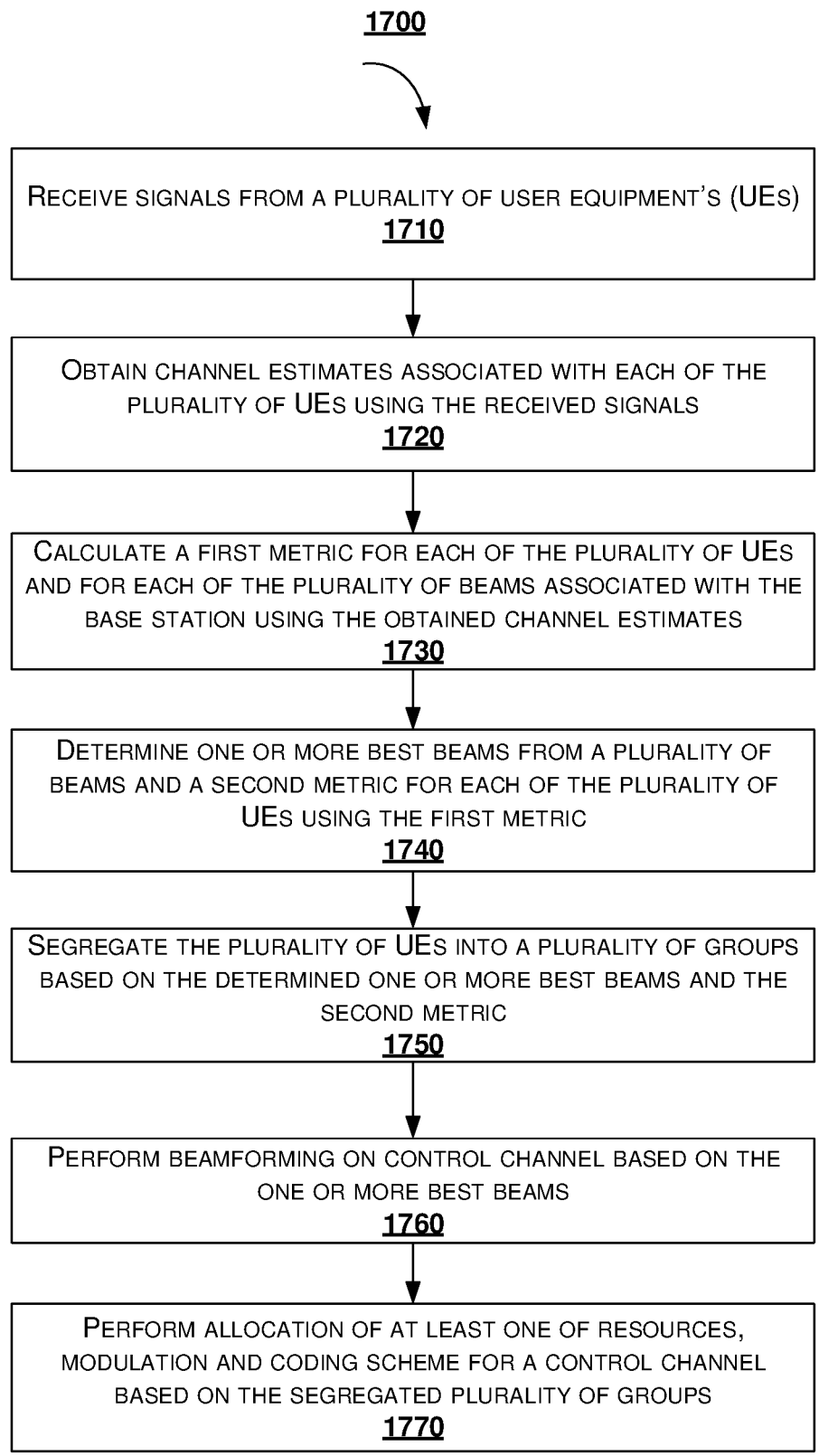

in azimuth plane, in accordance with an embodiment of the present disclosure;

FIG. 7 shows a plot illustrating antenna pattern of six beams for the base station with beamformed physical downlink control channel (BF-PDCCH) and conventional base station;

FIG. 8 shows an illustration of search space design of BF-PDCCH, in accordance with an embodiment of the present disclosure FIG. 9A shows an illustration of cell-specific reference signals (CRS), Common channels, Common Search Space (CSS) and user search space 1 (USS-1) transmission with BF-PDCCH, in accordance with an embodiment of the present disclosure;

FIG. 9B shows an illustration of CRS and USS-2 transmission with the BF-PDCCH, in accordance with an embodiment of the present disclosure;

FIG. 10 shows an illustration a plot between bit error rate (BER) and signal to interference plus noise ratio (SINR) for both the estimation and abstraction for various interference levels, in accordance with an embodiment of the present disclosure;

FIG. 11 shows a plot illustrating block error rate (BLER) curves for various aggregation levels, in accordance with an embodiment of the present disclosure;

FIG. 12 shows a flow chart illustrating the method of beamforming PDCCF (BF-PDCCH), in accordance with an embodiment of the present disclosure;

FIG. 13 shows a pictorial representation of user scheduling in 1 and 2 best beams respectively, in accordance with an embodiment of the present disclosure;

FIG. 14 shows a plot illustrating variation of SINR of users with BF-PDCCH and the existing 3GPP schemes;

FIG. 15 shows a histogram of average number of users scheduled across various ALs using the BF-PDCCH and conventional methods; and FIG. 16 shows a plot illustrating CDF plot of number of users scheduled/CCE in accordance with an embodiment of the present disclosure; and FIG. 17 shows a flowchart illustrating a method of wireless communication by a base station, in accordance with some embodiments of the present disclosure.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

Additional features and advantages are realized through the techniques of the present disclosure. Other embodiments an d aspects of the disclosure are described in detail herein and are considered a part of the claimed disclosure.

Embodiments of the present disclosure are related to beam formed physical downlink control channel (BF-PDCCH) method of wireless communication, which avoids using resources associated with data channel and increasing the PDCCH capacity. The BF-PDCCH method depends on the uplink sounding reference signals (SRS) transmitted from the user. In an embodiment, a multi-user multiple input multiple output (MIMO) feature of BF-PDCCH is enabled, only to the users who have sent the uplink SRS. Also, the BF-PDCCH method schedules all the other users in a legacy long term evolution (LTE) approach.

Figure 1A:
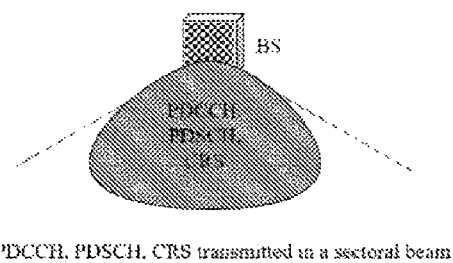
FIGS. 1A and 1B shows transmission of the physical layer signals in both Release 8 and Release 13, as a prior art.
Figure 1B:
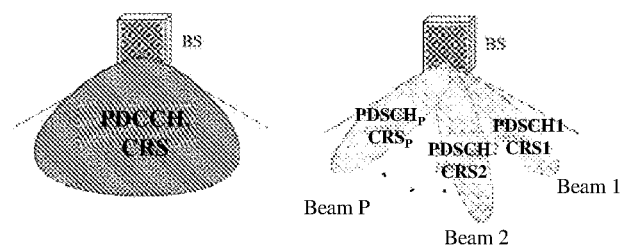
Figure 2:
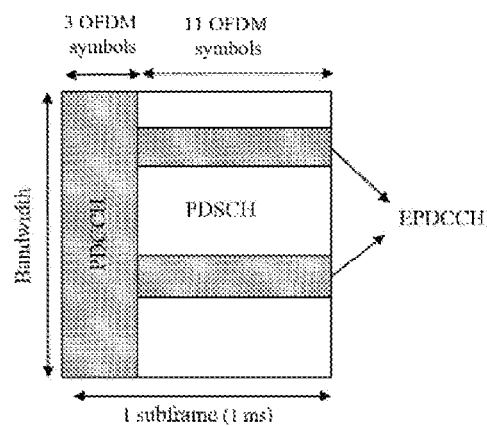
FIG. 2 shows enhanced physical downlink control channel (EPDCCH) configuration in a sub-frame, as a prior art.
Figure 3:
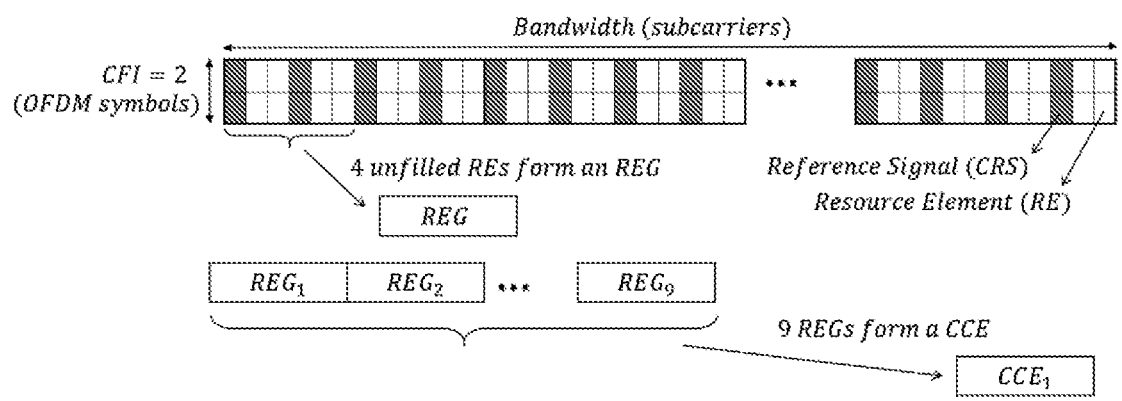
FIG. 3 shows formation of control channel element (CCE) as per standard 3GPP specifications, as a prior art.
Figure 4:
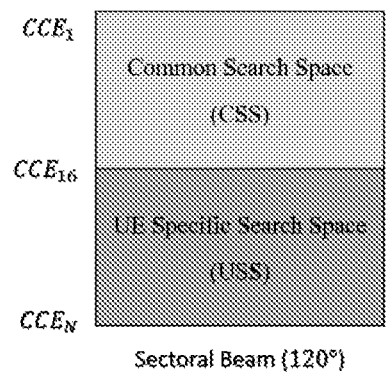
FIG. 4 shows a search space design of physical downlink control channel (PDCCH), as a prior art.
Figure 5:
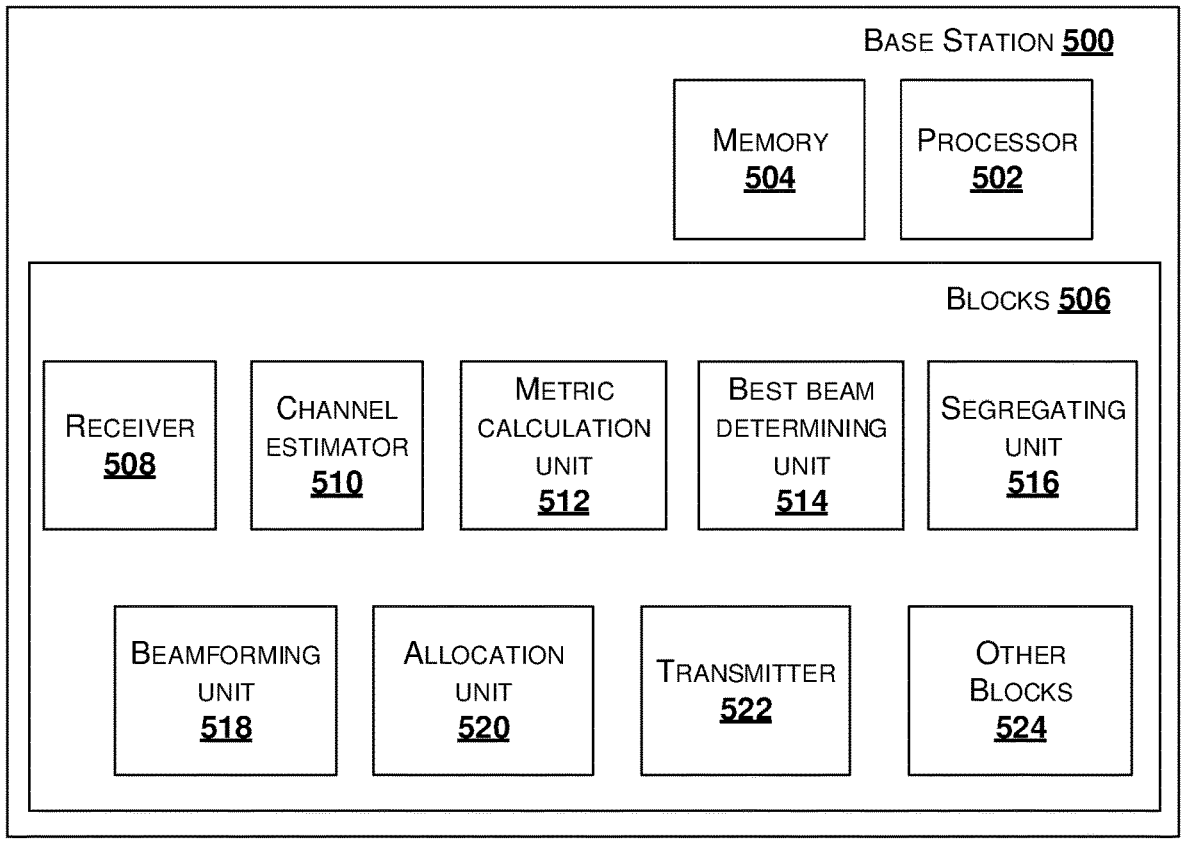
FIG. 5 shows a block diagram of a base station to perform an optimized wireless communication, in accordance with an embodiment of the present disclosure.

FIG. 5 shows a block diagram of a base station to perform an optimized wireless communication, in accordance with an embodiment of the present disclosure.

As shown in FIG. 5, the base station (BS)500 includes the processor 502, and the memory 504. The memory 504 may be communicatively coupled to the processor 502. In an embodiment, the BS 100 may be operated in long-term evolution (LTE) or fifth generation (5G) new radio (NR). The processor 502 may be configured to perform one or more functions of BS 500. The BS 500 is also referred as a communication system or wireless communication system. In an embodiment, the BS 500 includes a plurality of antennas (not shown in the figures) to perform various operations associated with transmission and reception of signals from a plurality of user equipment's (UE). In one implementation, the BS 100 may comprise modules or blocks 506 for performing various operations in accordance with the embodiments of the present disclosure. The blocks 506 are also referred as units or modules. The blocks 506 includes a receiver 508, a channel estimator 510, a metric calculation unit 512, best beam determining unit 514, a segregation unit 516, a beamforming unit 518, an allocation unit 520, a transmitter 522 and other blocks 524. The channel estimator 510 is also referred as a channel estimating unit or channel estimation unit. In an embodiment, the receiver 508 block comprises one or more receivers. In an embodiment, the transmitter 522 block comprises one or more transmitters. The blocks 506 also comprises other blocks 524 to perform various miscellaneous functionalities of the BS 500.

In an embodiment, the receiver 508 is configured to receive the signals from the plurality of UEs. The signals received from the plurality of UEs comprises sounding reference signals (SRS) and other reference signals. Also, the receiver receives information from the plurality of UEs, that comprises at least one parameter associated with capability of performing spectrum shaping for data or reference signal transmission.

The channel estimator 510 used the received signals from the plurality of UEs, i.e. the SRS signals and obtains channel estimates associated with each of the plurality of UEs. The metric calculation unit 512 calculates the metrics, which includes a first metric and a second metric. The metric calculation unit 512 calculates the first metric associated with each of the plurality of UEs using the obtained channel estimates. The first metric is signal to inference plus noise ratio (SINR) value.

In an embodiment, metric calculation unit 512 calculates for each of the plurality of beams associated with the base station using the obtained channel estimates. In an embodiment, the metric calculation unit 512 obtains the second metric for each of the plurality of UEs using the first metric. The second metric is a downlink control information (DCI) aggregation level (AL). In an embodiment, the best beam determining unit 514 determines one or more best beams from a plurality of beams associated with the base station 500. The plurality of beams associated with the base station are designed to meet coverage requirements.

The segregating unit 516 segregates the plurality of UEs into a plurality of groups based on the determined one or more best beams and the second metric. Each of the plurality of groups comprises one or more UEs. In an embodiment, the segregating unit 516 segregates the plurality of UEs in to two groups, comprising a first group and a second group. The first group comprises a first set of UEs, wherein the first metric associated with each of the first set of UEs is greater than a threshold value. The first set of UEs are scheduled for communication using a first set of resources. The first set of resources corresponds to one of time and frequency resources used for scheduling physical downlink control channel (PDCCH) of the base station. The first set of resources corresponds to User Search Space 1 (USS-1).

In an embodiment, the segregated second group comprises a second set of UEs, wherein the first metric associated with each of the second set of UEs is less than the threshold value. The second set of UEs are scheduled for communication using a second set of resources. The second set of resources corresponds to one of time and frequency resources used for scheduling physical downlink control channel (PDCCH) of the base station. The second set of resources corresponds to User Search Space-2 (USS-2).

Also, the base station BS 500 transmits information associated with all the users on a third set of resources. The third set of resources corresponds to one of time and frequency resources used for scheduling physical downlink control channel (PDCCH) of the base station. The third set of resources corresponds the common search space (CSS).

The beamforming unit 518 performs beamforming on control channel based on the one or more best beams obtained from the best beam determining unit 514. The beamforming weights are obtained using at least one of the first metric and the second metric. In an embodiment, the beamforming is performed on a resource element with a predetermined beam pattern from the plurality of beams associated with the base station. Thereafter, the allocation unit 520 performs allocation of at least one of resources, modulation and coding scheme for a control channel based on the segregated plurality of groups. Thereafter, transmitting beamformed PDCCH (BF-PDCCH) on the allocated resources to the one or more UEs. This beamformed PDCCH achieves significant improvement in the network capacity or achieve high network throughput.

The transmitter 522, is also referred as a transmitting unit, is configured in the BS 500 to transmit signals or information to the plurality of UEs. The transmitted signals or information by the BS 500 comprises parameters associated with at least one of physical uplink shared channel (PUSCH) and physical uplink control channel (PUCCH) transmission. The transmit signals are at least one of resources, modulation and coding scheme (MCS) for a control channel based on the segregated plurality of groups, in an embodiment. Also, the parameters may be at least one of a modulation technique, value associated with activation of spectrum shaping for transmission, maximum power back-off, maximum transmission power, and a number of tones for transmission, in an embodiment.

In an embodiment, the base station 500 as shown in FIG. 5 considers a plurality of beam, i.e. P beams are active in the sector all the time to implement multi-user MIMO and achieve multi-fold improvement in the capacity. Also, the BS 500 assumes same channel characteristics on primary synchronization signal (PSS), secondary synchronization signal (SSS), physical broadcast channel (PBCH) and physical downlink control channel (PDCCH), as they rely on CRS in an embodiment. Hence, all of these behave similarly in terms of spatial configuration. Thus, by beamforming PDCCH, the BS 500 also facilitates such that beamforming is performed for the CRS, the PBCH, the PSS and the SSS. The BS 500 achieves improved channel capacity for PDCCH considering all these constraints and thus beamforming the PDCCH.

Figure 6A:
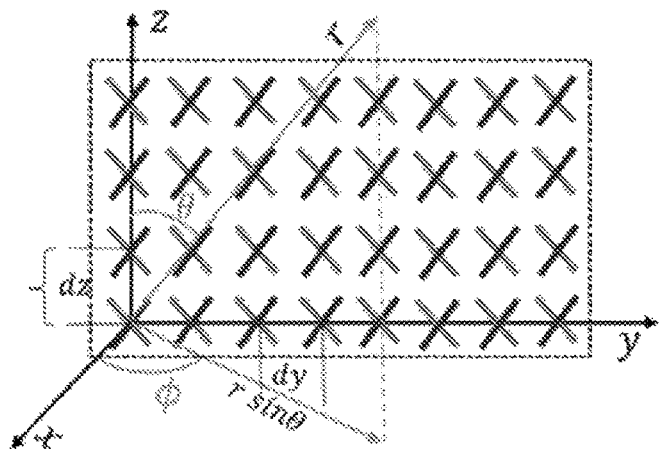
FIG. 6A shows an antenna array structure, in accordance with an embodiment of the present disclosure.

FIG. 6A shows an antenna array structure, in accordance with an embodiment of the present disclosure. As shown in FIG. 6A, the antennas of the antennas array structure generate beams for the BF-PDCCH. As shown in the FIG. 6A, a dotted rectangular panel array is described using a tuple (Mg, Ng, M, N, P), where, Mg and Ng represent the number of panels in the vertical and horizontal direction. M and N represents the number of antenna elements with the same polarization in the vertical and horizontal direction in each panel, and P represents the panel is either single polarized (P=1) or cross-polarized (P=2). As an example, a uniform rectangular array is considered which has the configuration of (1, 1, 4, 8, 2), where 4 elements are placed in vertical, 8 elements in horizontal and each array is being a cross-polarized which has a total of 64 antenna elements. Using this antenna structure, an effective array factor (AF) is calculated using the below equation (2):

$$AF = \sum_{n=1}^{N} \sum_{m=1}^{M} e^{j(m-1)(kdz \sin \varphi \cos \theta + \beta_z)} \times e^{j(m-1)(kdz \sin \varphi \cos \theta + \beta_z)} \quad (2)$$

where k=2π/λ, dy and dz are the antenna element spacing in horizontal and vertical, φ and θ are the azimuth and the elevation angles and, $\beta_y$ and $\beta_z$ are the phase excitations for the antenna elements in the y and z axes respectively. As shown in the FIG. 6A, φ and θ are the angles with respect to x-axis and z-axis respectively.

Figure 6B:
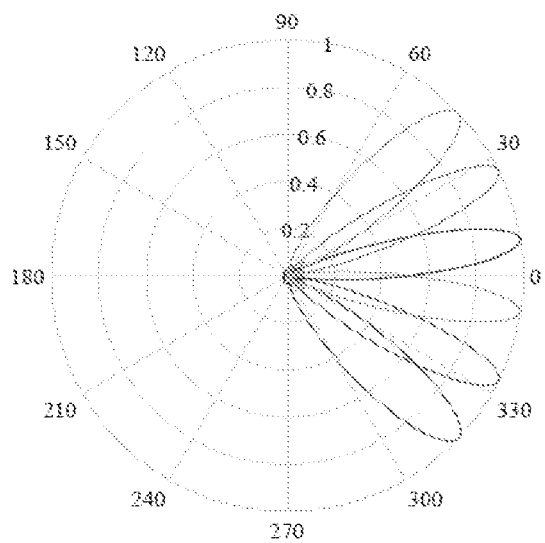
FIG. 6B shows a plot illustrating a normalized radiation pattern of six beams in a sector at $$\left[ \frac{-5\pi}{20}, \frac{-3\pi}{20}, \frac{-\pi}{20}, \frac{\pi}{20}, \frac{3\pi}{20}, \frac{5\pi}{20} \right]$$

FIG. 6B shows a plot illustrating a normalized radiation pattern of six beams in a sector at $$\left[ \frac{-5\pi}{20}, \frac{-3\pi}{20}, \frac{-\pi}{20}, \frac{\pi}{20}, \frac{3\pi}{20}, \frac{5\pi}{20} \right]$$

in azimuth plane, in accordance with an embodiment of the present disclosure. A sample set of six beams covering the 120° sector is generated using the antenna array structure of FIG. 6A. The desired directions of the beams are assumed to be at six positions equidistant from one other in the region of [60°, 60°] in the azimuth plane.

FIG. 7 shows a plot illustrating antenna pattern of six beams for the base station with beamformed physical downlink control channel (BF-PDCCH) and conventional base station. For each beam, gains in the azimuth plane are plotted and are compared against the conventional sectoral pattern, as shown in FIG. 7. Also, as shown in FIG. 7, the side lobes are below the 10 dB level for each beam and all the six beams cover the entire 120° sector similar to the legacy LTE sectoral pattern.

In an embodiment, for transmission of data in the desired beams, the resource elements are multiplied with respective beam weights. A resource element is beamformed or transmitted in a particular direction by performing precoding, with the required beam pattern using following equations:

$$\widetilde{x_{k,l}^i} = w_i x_{k,l}^i \quad (3)$$

$$w_i = \sum_{m=1}^{N} \sum_{n=1}^{M} e^{j(m-1)(kdz \cos\phi \sin\theta + \beta_z(i))} \times e^{j(n-1)(kdy \sin\phi \cos\theta + \beta_y(i))} \quad (4)$$

where, $\widetilde{x_{k,l}^i}$, $x_{k,l}^i$ are the resource elements at (k, l) index of frequency-time before and after beamforming respectively, $w_i$ has the beam weights for $i^{th}$ beam, and $\beta_y(i)$ and $\beta_z(i)$ are the phase shifters generated for the $i^{th}$ beam.

One embodiment of the present disclosure is multi-user MIMO, for which, initially, the best beams for each user is identified using the base station 500, as shown in FIG. 5. A search space is configured for beamformed PDCCH using the Base station 500, using P active beams in the sector all the time. These beams are spatially well separated, and thus, the transmission is done simultaneously in each beam with minimal interference. This way, multi-fold improvement is achieved in the network throughput. The signals PSS, SSS, PBCH, PCFICH, PHICH and CRS are assumed having same channel characteristics as they rely on CRS. Hence, all of these have to behave similarly in terms of spatial configuration. Thus, if PDCCH has to be beamformed, then it forces CRS, PBCH and PSS/SSS also to be beamformed. With all these constraints, a PDCCH beamforming has to be designed, which can improve the PDCCH capacity.

In an embodiment, the base station 500 is configured with a search space for BF-PDCCH, which is divided into three regions Common Search Space (CSS), UE specific Search Space 1 (USS-1) and USS-2. FIG. 8 shows an illustration of search space design of BF-PDCCH, in accordance with an embodiment of the present disclosure. The CSS has to address all the users present in the sector, and also CSS has to be present in all the beams exactly at same CCEs. The UE specific space (USS) has to be scheduled differently in each beam, i.e. to identify the best beam for each user.

The base station 500 is configured to achieve BF-PDCCH using a sounding reference signal (SRS) transmitted in the uplink from the user. By assigning appropriate beam to each user, the USS is scheduled differently in each beam. Further, some users are at the cell edge/beam edge and experience a large interference with this dynamic scheduling of different data streams in each beam. Hence, the USS beamforming is applied only for the users who are at the boresight of the beam. Therefore, USS is split into two search spaces, USS-1 and USS-2. As shown in FIG. 8, the search space for BF-PDCCH is divided into three regions. The CSS is configured such that irrespective of the available bandwidth, CSS is present in the first 16 CCEs of the PDCCH. Since the CSS is common to all the users in the sector, it is present in all the beams. The USS-1 includes DCIs addressing the users at cell edge/beam-edge and hence, is present in all the beams. The USS-2 included the DCIs addressing the users at boresight. Different DCIs are scheduled in each beam and hence, the improvement in PDCCH capacity is achieved by USS-2.

The users are not aware of PSS/SSS, common channels and the PDCCH being beamformed. The users decode all the channels as per the standard specifications. The users are scheduled in USS-2 only when the BS 500 receives the SRS from the user. Until then, the user will be scheduled in USS-1. Further, the CSS and the USS regions do not deviate from the standard specification. There is no extra signaling for the user to indicate where it has to perform the blind decoding. Only the base station has the notion of USS-1 and USS-2, which schedules users in USS-1 and USS-2. The user may not aware that the PDCCH is being beamformed. The user considers the region of USS-1 and USS-2 as a regular USS and performs the blind decoding as in a regular LTE.

One embodiment of the present disclosure is about the impact on the performance of various channels using the beamforming method and channel estimation of common channels, CSS and USS-1. FIG. 9A shows an illustration of cell-specific reference signals (CRS), Common channels, Common Search Space (CSS) and user search space 1 (USS-1) transmission with BF-PDCCH, in accordance with an embodiment of the present disclosure. As shown in the FIG. 9A, the CRS and USS-1 are present in all the beams, the users observe the same channel for both of them.

Considering $y_{crs}$ and $y_{u_1}$ denote the received CRS and the data symbols, $x_{crs}$ and $x_{u_1}$ denote the transmitted CRS and USS-1 symbols, $w_i$ denote the beam weights as shown in equation 4, h and n denote the observed channel and the noise respectively. The estimated channel $h_{estimate}$ is represented using the below equation:

$$y_{crs} = \sum_{i=1}^{P} hw_i x_{crs} + n \tag{5}$$

$$h_{experienced} = \sum_{i=1}^{P} hw_i$$

$$h_{estimate} = \frac{y_{crs}}{x_{crs}}$$

$$= \sum_{i=1}^{P} hw_i + \hat{n} = h_{experienced} + n^{\wedge}$$

$$y_{u_1} = \sum_{i=1}^{P} hw_i x_{u_1} + n$$

$$y_{equalised} = \frac{y_{u1}}{h_{estimate}} = x^{\wedge}{u1} + \tilde{n} \tag{6}$$

As $x_{crs}$ and $x_{u1}$ are transmitted in all the beams i=1, . . . , P and both observe the same channel the decoding has minimal impact when the $h_{estimate}$ is used to equalize the received data $y_{u_1}$.

One embodiment of the present disclosure is channel estimation for the USS-2. FIG. 9B shows an illustration of CRS and USS-2 transmission with the BF-PDCCH, in accordance with an embodiment of the present disclosure. As shown in FIG. 9B, different data is present in each beam for USS-2. For a user with data transmitted in $i^{th}$ beam, the received CRS ($y_{crs}$), the received data ($y_{u2}$), the estimated channel ($h_{estimate}$) and the equalized data ($y_{equalized}$) are represented using the below equations 7 and 8:

$$y_{crs} = hw_i x_{crs} + \sum_{j=1, j \neq i}^{P} hw_i x_{crs} + n \tag{7}$$

$$h_{experienced} = \sum_{i=1}^{P} hw_i$$

$$h_{estimate} = \frac{y_{crs}}{x_{crs}}$$

$$= hw_i + \sum_{j=1, j \neq i}^{P} hw_j + n^{\wedge}$$

$$= h_{experienced} + h_{interference} + n^{\wedge}$$

$$y_{u2} = hw_i x_{u2}^i + \sum_{j=1, j \neq i}^{P} hw_j x_{u2}^j + n$$

$$y_{equalised} = \frac{y_{u2}}{h_{estimate}} = x^{\wedge}{u1} + \tilde{n} \tag{8}$$

$$= \hat{x}_{u2}^i + x_{interference} + \tilde{n}$$

for a user in $i^{th}$ beam the channel experienced by the data is $hw_i$. Since, same $x_{crs}$ is present in all the beams, the user estimated channel may be $\Sigma_{i=1}^{P} hw_i$. Thus, the estimated channel has errors caused by the other active beams. Also, there is an extra interference from other beams on the data as well. Both of these errors are represented as $h_{interference}$ and $x_{interference}$ as represented in equations 7 and 8. Thus, there is an impact on the decoding of data for the USS-2. Hence, with the BF-PDCCH, the operating signal to interference plus noise ratio (SINR) of the user will drop, and the user requires a comparatively large AL when transmitted in USS-2. Even though if there is an increase of AL for a user in USS-2, which may be compensated for this increased AL by packing more users within the existing resources by using the beam-specific scheduling for BF-PDCCH, i.e., multi-user MIMO concepts on the PDCCH. In an embodiment, the increase in the channel capacity for the BF-PDCCH may be achieved through USS-2.

FIG. 10 shows an illustration a plot between bit error rate (BER) and signal to interference plus noise ratio (SINR) for both the estimation and abstraction for various interference levels, in accordance with an embodiment of the present disclosure. As shown in FIG. 10, this plot is obtained by generating curves between block error rate (BLER) verses signal to interference plus noise ratio (SINR) for different modulation and coding schemes. For the BF-PDCCH evaluation, the channel estimation errors are abstracted followed by the abstraction to be used in the system level simulations. These are link level simulation and abstraction of the block error rate (BLER) for mapping SINR to AL For link level simulations, abstraction of channel estimation errors for USS-2 is obtained from equations 7 and 8, it can be observed that the degradation in the SINR of a user is mainly because of the interference observed in the channel estimation and the data. As shown in equations 7 and 8, there is an impact of interference from other beams while estimating the channel $h_{estimate}$ and similar interference levels are seen while equalizing the data $y_{u2}$. Hence, a twice the interference from the other beams in the current sector is added as an additional interference to compensate the both effects and the SINR is formulated as shown in equation 9:

$$SINR_{abs} = \frac{\|h\omega_i\|^2}{\sigma_n^2 + 2\sum_{j=1, j\neq i}^{P} \alpha_j} \quad (9)$$

where aj is the inter beam leak from the $j^{th}$ beam of the current sector.

In an embodiment, link level simulations are performed with channel estimation and the abstraction. The simulations are carried for Rayleigh fading channel, QPSK modulation and various inter beam leak (aj) levels. For the estimation curves, the channel is estimated in the presence of interference from the other beams as per equations 7 and 8, and the bit error rate (BER) is calculated. For the abstraction, the impact of the channel estimation errors is captured in the SINR obtained as per equation 9, and the BER is calculated.

One embodiment of the present disclosure is abstraction of the block error rate (BLER) for mapping SINR to AL. The link level simulations are performed for the parameters mentioned in below Table-1 and the block error rates (BLER) are obtained for plotting a curve as shown in FIG. 11, for various values of ALs. FIG. 11 shows a plot illustrating block error rate (BLER) curves for various aggregation levels, in accordance with an embodiment of the present disclosure. For the link abstraction in system level simulations, considering 1% block error rate as a reasonable metric and perform the mapping of SINR to allocate an AL for each user. This a standard and a widely used mechanism for mapping the rate to SINR. Thus, for a given SINR of each user, a minimum AL is chosen such that the BLER is less than 1% at that SINR.

Below is the Table-1 showing Link level simulation parameters

| Parameter | Value |
| --- | --- |
| DCI Size (format 1) | 31 bits |
| CRC length | 16 bits |
| Channel Coding | tail biting convolution code |
| Modulation | QPSK |
| Bandwidth | 10 MHz |
| Channel Model | AWGN |
| Aggregation levels | {1, 2, 4, 8} |
| Antenna configuration (BS, UE) | 1, 2 |

The above two abstractions are used in the system level simulations while evaluating the performance of the BF-PDCCH and various other 3GPP mechanisms.

One embodiment of the present disclosure is implementation of the method BF-PDCCH. FIG. 12 shows a flow chart illustrating the method of beamforming PDCCF (BF-PDCCH), in accordance with an embodiment of the present disclosure. A plurality of users transmits sounding reference signals (SRS) in the uplink. Considering abase station, having M×N array antennas i.e. M antenna elements in horizontal and N antenna elements in vertical station receives a channel coefficients H (of size M×N) on all the antennas from each user. A beam weights (Wi) for each specific beam are calculated using equation 4. The $SINR^1_j$ is defined as the signal to interference-plus-noise ratio when the data is transmitted for a user in $j^{th}$ beam. The base station schedules a user in one beam and BS observes interference from all the other beams. Using equation 9, SINR1 is calculated using the below equation:

$$SINR_j^1 = \frac{\|HW_j\|^2}{2\left\|\sum_{k=1, k\neq j}^{P} HW_k\right\|^2 + \sigma_n^2}, \forall j = 1, \ldots, P \quad (10)$$

In an embodiment, for each user the $SINR^1_j$ is calculated across all the active beams. Then, j is chosen for which $SINR^1_j$ is maximum, as the best beam for the user. For this chosen j, $SINR^1_j$ is compared against the minimum SINR required for AL=4 in legacy LTE case. If $SINR^1_j > SINR_{AL=4}$, then user is scheduled only $j^{th}$ beam. As an example, considering the following worst-case scenario where eight users require AL=1 in legacy LTE PDCCH scenario, and the same eight users need AL=4 in BF-PDCCH scenario with eight beams (P=8). When scheduled in legacy LTE PDCCH, the users need 8 CCEs. In the case of BF-PDCCH, they require 4 CCEs each when scheduled in a single best beam. However, the base station schedules the users across 8 beams using just 4 CCEs in total. Note that if the users require AL=1, 2 with BF-PDCCH, then the multiplexing gain increases further, and when the users require AL=8 with BF-PDCCH, the gain completely disappears. Hence, with eight beams active in the sector, the users are considered with a maximum of AL=4 for USS-2.

One embodiment is identifying the one or more best beams. Considering if $SINR^1_j < SINR_{AL=4}$, then for the user one or more best beams i.e. here two best beams are calculated. A second $SINR^2_j$ is defined as the signal to interference-plus-noise ratio when the base station schedules the user in two beams ([j+1]). This is considered such that the user observes interference from all the remaining beams in the sector.

$$SINR_j^2 = \frac{\left\|\sum_{k=j}^{j+1} h\omega_k\right\|^2}{2\left\|\sum_{k=1, k\neq [j, j+1]}^{P} h\omega_k\right\|^2 + \sigma_n^2}, \forall j = 1, \ldots, P-1 \quad (11)$$

A similar procedure like the above is followed and then the best beams [j, j+1] is chosen such that $SINR^2_j$ is maximum. The user is then scheduled in those two best beams, if $SINR^2_j < SINR_{AL}=4$. Note that for both the above cases, the base station schedules the users in USS-2. If the $SINR^2_j \leq SINR_{AL=4}$, then the user is assumed to be in cell edge/beam-edge. For these users, the base station schedules the data in all the beams in USS-1. FIG. 13 shows a pictorial representation of user scheduling in 1 and 2 best beams respectively, in accordance with an embodiment of the present disclosure.

One embodiment of the present disclosure is SRS channel estimation errors. In reality, the SRS channel estimations may differ from the actual channel observed by the base station. This difference can be due to the poor signal to noise power ratio of the user, channel aging, and the estimation algorithm used by the base station. These incorrect channel estimates have an impact on the beam selection procedure explained in Section 7.2. Hence, we have to consider these channel estimation errors in the simulator for observing the real-time gains with the BFPDCCH.

We follow the abstraction procedure mentioned in [23] for including the SRS estimation errors as follows.

$$\tilde{H} = \alpha(H + E) \qquad (12)$$

$$E \sim N\left(0, \sigma_E^2 \frac{2}{E}\right), \alpha = \sqrt{\frac{1}{1 + \sigma_E^2 \frac{2}{E}} \pi r^2}$$

where H is the actual channel observed by the base station (on M×N antenna elements), when the user transmits SRS in uplink, $\tilde{H}$ is the channel estimated by the base station, E is the additive white complex Gaussian noise with zero mean and $\sigma_E^2$ variance. To include the SRS channel estimation errors, $\tilde{H}$ is used instead of H in the beam selection procedure using the equations 10-11.

The parameters for the system level simulations are considered based on the 3GPP specifications, which are presented in below Table II.

TABLE II

System level simulation parameters

| Parameter | Value |
|---|---|
| Cell layout | 7 cell sites, 3 sectors/site |
| Inter-site distance | 500 m |
| BS antenna height | 25 m |
| UE antenna height | 1.5 m |
| Carrier frequency | 2.4 GHz |
| BS transmit power | 44 dBm |
| Number of antennae (BS, UE) | 64, 2 (BF-PDCCH), 1, 2 (LTE PDCCH) |
| Bandwidth | 20 MHz |
| Channel model | 3D UMa in TR 36.873 [24] |
| Direction of selective beams | Azimuth: $\left[\frac{-3\pi}{16}, \frac{-\pi}{16}, \frac{\pi}{16}, \frac{3\pi}{16}\right]$ Elevation: $\left[\frac{9\pi}{16}, \frac{11\pi}{16}\right]$ |
| Available DL CCEs | 42 (with CFI = 3 OFDM symbols) |
| Aggregation levels | {1, 2, 4, 8} |
| Extra PRBs for EPDCCH | 4 PRBs |
| BS antenna element radiation pattern | According to TR 36.873 [24] |

In one embodiment, link abstractions are configured for allocating AL based on the SINR of each user. This is performed by considering that the SINR degradation happening because of the CRS re-use. For comparing the performance of the BF-PDCCH of the BS 500, current 3GPP LTE PDCCH and EPDCCH schemes are implemented. For the EPDCCH, it is considered an extra four PRBs of resources available from the data channel. Further, an optimal scheduling procedure is implemented for comparing the performance of present BF-PDCCH.

The performance evaluation of all these schemes is carried out as follows. The users are dropped randomly in a cell site. For the given parameters in the Table 2, the SINR is calculated for each user. While calculating the SINR in each scheme, the interference from other sectors ($I_{wrap}$) is exhibited using wrap around technique. For the present disclosures BF-PDCCH, when the base station schedules the data in one best beam, the user observes interference from all the remaining P–1 beams. Similarly, when the base station schedules the data in two adjacent beams, the user observes interference from all the remaining P–2 beams. Apart from the interference from the other sectors and other beams, the user observes errors in the channel estimation because of CRS re-use happening across the beams. For each scheme, based on the link abstractions, mapping is performed for the ALs to each user based on the calculated SINR. For a given bandwidth and number of OFDM symbols, the available CCEs vary. Considering half the available CCEs carry downlink DCIs. Within this limited number of CCEs, scheduling is performed on the users with different ALs.

FIG. 14 shows a plot illustrating variation of SINR of users with BF-PDCCH and the existing 3GPP schemes. As shown in FIG. 14, the SINR distribution of users in BF-PDCCH is shown and compared against that of the legacy LTE. The highlighted region in FIG. 14 has the feasible SINR values where the users require AL<8. This region is calculated assuming a maximum block error rate (BLER) of 0.01. If a user has the SINR in this highlighted region, then the base station may spatially multiplex the other users in the other beams. Thus, the BS with the BF-PDCCH method achieves the spatial multiplexing gain. Also, when considering the SRS channel estimate errors, the beam selection is not perfect. If the base station schedules the users based on this imperfect beam selection, the user observes a degradation in the SINR. Hence, when the SRS estimation errors are included, the SINRs are low (black curves in FIG. 14) compared to that of without SRS errors (middle curves in FIG. 14). Further, even with SRS estimation errors, the base station can schedule more than 40% of the users in a single beam and more than 50% of the users in 2 best beams. In all these cases, the BF-PDCCH provides multiplexing gain.

FIG. 15 shows a histogram of average number of users scheduled across various ALs using the BF-PDCCH and conventional methods. As shown in FIG. 15, the allocation of the aggregation level with the present BF-PDCCH is compared against that of 3GPP LTE PDCCH, optimal LTE-PDCCH scheduler, and enhanced PDCCH. The optimal LTE PDCCH scheduler schedules the users in the available control channel region by minimizing the resource wastage. It has similar AL allocation as of the 3GPP LTE PDCCH. Compared to 3GPP LTE PDCCH, enhanced PDCCH has lesser users with AL=1 and more users with AL=2, 4.

When a user is scheduled in enhanced PDCCH region, the probability of having AL=1 is reduced because of the MU-MIMO scheduling, and thus, more number of users are scheduled with AL=2, 4. A similar change is observed with the BF-PDCCH as well. However, since the entire control channel is beamformed for MU-MIMO, the probability of users with AL=1 is further less than that of the enhanced PDCCH case and thus, the probability of users with AL=2, 4 has increased. Also, as shown in FIG. 14, when compared with 3GPP LTE PDCCH, there are more users with lower SINR values even when the data is transmitted in all the beams. Thus, the percentile of users with AL=8 is more than that of the 3GPP LTE PDCCH case. Note that even though the AL is increased, the network capacity will be enhanced because of the MU-MIMO feature. Further, with BF-PDCCH, when the SRS errors are included, the users requiring AL=1, 2 are comparatively reduced. These users require more repetition to compensate for the SRS estimation errors, and hence we see an increase in the percentile of AL=4.

FIG. 16 shows a plot illustrating CDF plot of number of users scheduled/CCE in accordance with an embodiment of the present disclosure. As shown in FIG. 16, the CDF of the number of users scheduled per CCE is presented for various methods. The number of CCEs available is more in enhanced PDCCH because of the extra four PRB resources, and hence, for a fair comparison, the normalization is carried out with the available CCEs for each method. In an embodiment, the LTE minimum bound is calculated, by scheduling each user with the maximum AL=8, all the time. For the LTE maximum bound, each user is scheduled with the minimum AL=1, all the time. The 3GPP LTE PDCCH has the least performance among all the schemes. In optimal scheduling algorithm, the user scheduling is done based on a set-packing problem, and thus, the base station can accommodate more users in the control channel region. Hence, the optimal LTE-PDCCH scheduler has comparatively more number of users scheduled per CCE. The EPDCCH has a better performance compared to the 3GPP LTE PDCCH and optimal LTE-PDCCH scheduler. However, note that EPDCCH uses an additional four PRBs from the PDSCH resources and also requires additional control signaling. The proposed BFPDCCH has better performance than all these schemes. Further, when channel estimation errors are considered, there is a drop in the number of users scheduled. However, even after the inclusion of the channel estimation errors, the present BF-PDCCH outperforms all the existing mechanisms and achieves more gains than the LTE maximum bound.

The average number of users scheduled in a TTI and the average BLER for each scheduling algorithm are presented in the Table 3. Excluding the LTE minimum and the maximum bounds, all the scheduling algorithms have an average BLER≈1%. This is because, in all these methods or schemes, the base station schedules the users with an AL such that BLER≤0.01.

Below is Table-III showing average users scheduled in a TTI and average BLER with the present BF-PDCCH and existing mechanisms:

TABLE III

| Method/Scheme | Average users/TTI | Average BLER |
|---|---|---|
| 3GPP LTE PDCCH | 22.1 | ≈1% |
| Optimal LTE-PDCCH Scheduler | 22.6 | ≈1% |
| Enhanced PDCCH | 26.6 | ≈1% |
| BF-PDCCH without SRS errors, of present disclosure | 50.3 | ≈1% |
| BF-PDCCH with SRS errors, of present disclosure | 34.4 | ≈1% |
| LTE Maximum Bound | 42 | ≈20% |
| LTE Minimum Bound | 5 | ≈0.1% |

However, for the LTE maximum bound, the base station schedules each user with AL=1, and hence with a very high chance, the error occurs for the users operating in poor signal coverage. In the LTE minimum bound, the base station schedules each user with the best possible AL=8. Thus average BLER is approximately 0.1% for the LTE minimum bound and is approximately 20% for the LTE maximum bound. In the present BF-PDCCH method, the users experience a poor operating SINR and require large AL. However, because of the multi-user MIMO, more number of users can be scheduled. From the Table-III and FIG. 16, it may be observed that the present BF-PDCCH achieves significant improvement in the network capacity.

FIG. 17 shows a flowchart illustrating a method of wireless communication by a station, in accordance with an embodiment of the present disclosure.

As illustrated in FIG. 17, the method 1700 comprises one or more blocks for wireless communication waveform by a base station. The method 1700 may be described in the general context of computer executable instructions. Generally, computer executable instructions can include routines, programs, objects, components, data structures, procedures, modules, and functions, which perform functions or implement abstract data types.

The order in which the method 1700 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 1710, receiving signals by the receiver 508, configured in the base station (BS) 500, the signals from the plurality of UEs. The signals received from the plurality of UEs comprises sounding reference signals (SRS) and other reference signals.

At block 1720, obtaining channel estimates associated with each of the plurality of UEs using the received signals. The channel estimator 510 configured in the BS 500 uses the SRS from the received signals to obtains channel estimates associated with each of the plurality of UEs.

At block 1730, calculating a first metric, by the metric calculation unit 512 configured in the BS, for each of the plurality of UEs, and for each of the plurality of beams associated with the BS 500 using the obtained channel estimates. The first metric is a signal to inference plus noise ratio (SINR) value.

At block 1740, determining, by the best beam determining unit 514 configured in the BS 500, one or more best beams from a plurality of beams associated with the base station, and a second metric for each of the plurality of UEs using the first metric. The plurality of beams associated with the base station are designed to meet coverage requirements.

At block 1750, segregating, by the segregating unit 516 configured in the BS 500, the plurality of UEs into a plurality of groups based on the determined one or more best beams and the second metric. Each of the plurality of groups comprises one or more UEs. The segregating comprises segregating the plurality of UEs in to two groups, comprising a first group and a second group. The first group comprises a first set of UEs, wherein the first metric associated with each of the first set of UEs is greater than a threshold value. The first set of UEs are scheduled for communication using a first set of resources. The first set of resources corresponds to one of time and frequency resources used for scheduling physical downlink control channel (PDCCH) of the base station.

The segregated second group comprises a second set of UEs, wherein the first metric associated with each of the second set of UEs is less than the threshold value. The second set of UEs are scheduled for communication using a second set of resources. The second set of resources corresponds to one of time and frequency resources used for scheduling physical downlink control channel (PDCCH) of the base station.

At block 1760, performing beamforming, by beamforming unit 518 configured in the BS 500, on control channel based on the one or more best beams. The beamforming is obtained using at least one of the first metric and the second metric. The beamforming is performed on a resource element with a predetermined beam pattern from the plurality of beams associated with the base station.

At block 1770, performing allocation, by the allocation unit 520 configured in the BS 500, of at least one of resources, modulation and coding scheme for a control channel based on the segregated plurality of groups. Thereafter, transmitting beamformed PDCCH (BF-PDCCH) on the allocated resources to the one or more UEs. This beamformed achieves significant improvement in the network capacity.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method for wireless communication, the method comprising:
   receiving, by a base station, signals from a plurality of user equipment devices (UEs);
   obtaining, by the base station, channel estimates associated with each of the plurality of UEs using the received signals;
   calculating, by the base station, a first metric for each of the plurality of UEs according to the obtained channel estimates;
   calculating, by the base station, a plurality of beams associated with the base station according to the obtained channel estimates;
   determining, by the base station, one or more best beams from the plurality of beams associated with the base station;
   determining, by the base station, a second metric for each of the plurality of UEs using the first metric;
   segregating, by the base station, the plurality of UEs into a plurality of groups based on the determined one or more best beams and the second metric, each of the plurality of groups comprises one or more UEs;
   performing beamforming, by the base station, on a control channel based on the one or more best beams; and
   performing allocation, by the base station, of at least one of resources, modulation and coding scheme for the control channel based on the segregated plurality of groups.

2. The method as claimed in claim 1, wherein the signals received from the plurality of UEs comprise sounding reference signals (SRS) and other reference signals.

3. The method as claimed in claim 2, wherein the channel estimates associated with each of the plurality of UEs are obtained using the SRS.

4. The method as claimed in claim 1, wherein the first metric is signal to inference plus noise ratio (SINR).

5. The method as claimed in claim 1, wherein the second metric is a downlink control information (DCI) aggregation level.

6. The method as claimed in claim 1, wherein the plurality of beams associated with the base station are designed to meet coverage requirements.

7. The method as claimed in claim 1, wherein the method comprises segregating the plurality of UEs into two groups, said two groups comprise first group and a second group.

8. The method as claimed in claim 7, wherein the first group comprises a first set of UEs, and wherein the first metric associated with each of the first set of UEs is greater than a threshold value.

9. The method as claimed in claim 8, wherein the first set of UEs are scheduled for communication using a first set of resources, said first set of resources corresponds to one of time and frequency resources used for scheduling physical downlink control channel (PDCCH) of the base station.

10. The method as claimed in claim 7, wherein the second group comprises a second set of UEs, and wherein the first metric associated with each of the second set of UEs is less than a threshold value.

11. The method as claimed in claim 10, wherein the second set of UEs are scheduled for communication using a second set of resources, said second set of resources corresponds to one of time and frequency resources used for scheduling physical downlink control channel (PDCCH) of the base station.

12. The method as claimed in claim 11, wherein information associated with one or more users is sent on a third set of resources, said third set of resources corresponds to one of time and frequency resources used for scheduling physical downlink control channel (PDCCH) of the base station.

13. The method as claimed in claim 1, wherein the beamforming is performed on a resource element with a predetermined beam pattern from the plurality of beams associated with the base station.

14. The method as claimed in claim 1, wherein the beamforming is obtained using at least one of the first metric and the second metric.

15. A base station comprising:
a channel estimator operable to obtain a plurality of channel estimates, wherein each channel estimate is associated with one of a plurality of user equipment devices (UEs);
a metric calculation unit operable to calculate a first metric and a second metric for each of the plurality of UEs according to the obtained channel estimates;
a best beam determining unit operable to determine one or more best beams from a plurality of beams associated with the base station;
a segregating unit operable to segregate the plurality of UEs into a plurality of groups according to the determined one or more best beams and the second metric, each of the plurality of groups comprises one or more UEs;
a beamforming unit operable to form a control channel according to the one or more best beams; and
an allocation unit operable to allocate at least one modulation and coding scheme for the control channel according to the segregated plurality of groups.

16. The base station as claimed in claim 15, wherein each channel estimate is obtained using a sounding reference signal.

17. The base station as claimed in claim 15, wherein each of a first group of UEs is associated with a first metric that is greater than a first threshold value, and wherein each of a second group of UEs is associated with a first metric that is less than a second threshold value.

18. The base station as claimed in claim 17, wherein:
the first group of UEs are scheduled for communication using a first set of resources,
the second group of UEs are scheduled for communication using a second set of resources,
the first set of resources corresponds to one of time and frequency resources used for scheduling a physical downlink control channel (PDCCH),
the second set of resources corresponds to one of time and frequency resources used for scheduling a PDCCH, and
the first set of resources are different than the second set of resources.

19. The base station as claimed in claim 18, wherein information associated with one or more users is sent on a third set of resources, and wherein the third set of resources corresponds to one of time and frequency resources used for scheduling a PDCCH.

20. The base station as claimed in claim 15, wherein the beamforming is performed on a resource element with a predetermined beam pattern, and wherein the beamforming is obtained according to at least one of the first metric and the second metric.

* * * * *